United States Patent [19]

Keiser

[11] Patent Number: 4,563,298
[45] Date of Patent: Jan. 7, 1986

[54] METAL OXIDE/SILICA SOLS

[75] Inventor: Bruce A. Keiser, Naperville, Ill.

[73] Assignee: Nalco Chemical Company, Oak Brook, Ill.

[21] Appl. No.: 509,745

[22] Filed: Jun. 30, 1983

[51] Int. Cl.$^4$ .................. B01J 13/00; C04B 35/14
[52] U.S. Cl. .................. 252/313.2; 106/287.34; 252/62.59
[58] Field of Search .................. 252/313 S, 62.59; 106/287.34

[56] References Cited

U.S. PATENT DOCUMENTS

| | | | |
|---|---|---|---|
| 1,930,853 | 10/1933 | Kolick et al. | 252/311 |
| 1,951,718 | 3/1934 | Ziese et al. | 252/313.1 |
| 2,085,129 | 6/1937 | Stoewener | 252/315.7 |
| 2,220,966 | 11/1940 | Krehma | 106/300 |
| 2,244,325 | 6/1941 | Bird | 252/313.2 |
| 2,248,943 | 2/1941 | Bley | 423/629 |
| 2,408,654 | 10/1946 | Kirk | 252/309 |
| 2,422,054 | 6/1947 | Tiger | 210/662 |
| 2,438,230 | 3/1948 | Ryznar | 252/313.1 |
| 2,443,512 | 3/1948 | Powers | 19/66 R |
| 2,560,707 | 7/1951 | Stark | 252/313.1 |
| 2,601,291 | 6/1952 | Horning et al. | 252/313.2 |
| 2,601,352 | 6/1952 | Wolter | 252/313.2 |
| 2,657,183 | 10/1953 | Bechtold et al. | 252/313.2 |
| 2,689,245 | 9/1954 | Merrill | 544/69 |
| 2,807,635 | 9/1957 | Breederveld et al. | 556/410 |
| 2,886,466 | 5/1959 | Iler et al. | 428/336 |
| 2,892,797 | 6/1959 | Alexander et al. | 252/313.2 |
| 2,929,790 | 3/1960 | Reuter et al. | 252/313.2 |
| 2,974,108 | 3/1961 | Alexander | 252/313.2 |
| 2,984,628 | 5/1961 | Alexander et al. | 1252/313.1 |
| 3,004,921 | 10/1961 | Stossel | 252/309 |
| 3,007,878 | 11/1961 | Alexander | 252/313.2 |
| 3,024,199 | 3/1962 | Pasfield | 252/313.1 |
| 3,098,044 | 7/1963 | Glover | 252/313.1 |
| 3,139,406 | 6/1964 | Mindick et al. | 252/313.1 |
| 3,198,743 | 8/1965 | MacCallum | 252/313.1 |
| 3,242,095 | 3/1966 | O'Connor | 252/635 |
| 3,244,639 | 4/1966 | Mindick et al. | 252/313.2 |
| 3,252,917 | 5/1966 | Mindick et al. | 252/313.2 |
| 3,256,204 | 6/1966 | O'Connor | 252/635 |
| 3,267,041 | 8/1966 | MacCallum | 252/313.1 |
| 3,281,216 | 10/1966 | Mindick | 23/299 |
| 3,326,910 | 6/1967 | Weldes | 544/69 |
| 3,342,747 | 9/1967 | Mindick et al. | 252/313.2 |
| 3,409,560 | 11/1968 | Faust | 252/309 |
| 3,442,817 | 5/1969 | Luebke | 252/313.1 |
| 3,455,718 | 7/1969 | Dithmar et al. | 106/287.17 |
| 3,462,373 | 8/1969 | Jongkind | 252/313.1 |
| 3,480,555 | 11/1969 | Jackson et al. | 252/62.56 |
| 3,520,824 | 7/1970 | Plank et al. | 252/313.2 |
| 3,629,139 | 12/1971 | Vossos | 252/309 |
| 3,630,952 | 12/1971 | Nielsen | 252/309 |
| 3,630,954 | 12/1971 | Yates | 252/313 S |
| 3,634,286 | 3/1972 | Yates | 252/313.2 |
| 3,655,578 | 4/1972 | Yates | 252/313 S |
| 3,657,003 | 4/1972 | Kenney | 427/430.1 |
| 3,676,362 | 7/1972 | Yates | 252/309 |
| 3,691,089 | 9/1972 | Janzon et al. | 252/313.2 |
| 3,699,049 | 10/1972 | Pluta | 252/309 |
| 3,711,419 | 12/1973 | Marotta | 252/313.2 |
| 3,718,584 | 2/1973 | Beste et al. | 252/604 |
| 3,719,607 | 3/1973 | Moore | 252/313.2 |
| 3,745,126 | 7/1973 | Moore | 252/313.2 |
| 3,745,126 | 7/1973 | Moore | 252/313.2 |
| 3,756,958 | 10/1973 | Iler | 252/313.2 |
| 3,776,987 | 12/1973 | Grimes | 264/0.5 |
| 3,795,522 | 3/1974 | Fox et al. | 501/93 |
| 3,864,142 | 2/1975 | Kovarik | 252/313 S X |
| 3,870,545 | 3/1975 | Tabacek et al. | 427/250 |
| 3,888,788 | 6/1975 | Yates | 252/309 |
| 3,956,171 | 5/1976 | Moore et al. | 252/313.2 |
| 3,956,171 | 5/1976 | Moore et al. | 252/313.2 |
| 4,017,418 | 4/1977 | Crompton et al. | 252/609 |
| 4,022,710 | 5/1977 | Kobashi et al. | 252/313.1 |
| 4,028,266 | 6/1977 | Langere et al. | 252/610 |
| 4,054,536 | 10/1977 | Schaefer et al. | 252/313.2 |
| 4,054,536 | 10/1977 | Schaefer et al. | 252/313.2 |
| 4,065,544 | 12/1977 | Hamling et al. | 423/252 |
| 4,097,286 | 6/1978 | Dafter, Jr. | 106/1.11 |
| 4,111,846 | 9/1978 | Elliott, Jr. | 502/65 |
| 4,137,087 | 1/1979 | Blasko et al. | 106/84 |
| 4,141,861 | 2/1979 | Courty et al. | 502/302 |
| 4,144,074 | 3/1979 | Itoh et al. | 106/1.17 |
| 4,166,147 | 8/1979 | Lange et al. | 428/328 |
| 4,181,532 | 1/1980 | Woodhead | 501/85 |
| 4,261,747 | 4/1981 | Feldstein | 106/1.11 |

*Primary Examiner*—Edward A. Miller
*Assistant Examiner*—Catherine S. Kilby
*Attorney, Agent, or Firm*—John G. Premo; Donald G. Epple

[57] ABSTRACT

A stable aqueous alkaline metal oxide/silica sol is obtained by adding a water-soluble amine to an acidic metal oxide/silica sol which contains from 5–40% by weight $SiO_2$, from 1–10.5% by weight of metal oxide, and a water-soluble anionic stabilizing compound selected from the group consisting of water-soluble anionic surfactants having an HLB greater than 8 and water-soluble carboxylic acid polymers with the ratio of metal oxide to water-soluble anionic stabilizing compound being within the range of 0.3:1 to 15:1.

2 Claims, No Drawings

METAL OXIDE/SILICA SOLS

INTRODUCTION

It has been previously known to place metal oxide coatings on silica sols. These alleged coated sols are useful in a variety of applications. A well-known metal oxide coated silica sol is the so-called titania coated silica sol. A method of preparing such sols is disclosed in U.S. Pat. No. 3,244,639.

Titanium coated silica sols also have been prepared by batch addition of a bicarbonate form anion exchange resin to a mixture of titanium chloride and deionized silica sols. This procedure generates a gelatinous white precipitate which must be discarded while use is made of the supernatent. In addition, the handling of the bicarbonate form anion resin is difficult due to foaming and filtration problems. Finally, careful monitoring of solution pH and conductance are required to prevent instantaneous gelation. Unfortunately, even with these carefully monitored parameters, the sols will gel within 3-4 days.

Another metal oxide used to coat silica sols is aluminum oxide. Such alumina coated sols are described in several publications, one of which is U.S. Pat. No. 3,007,878. Other than coatings of titania and alumina on silica, little, if any, can be found in the literature dealing with silica sols combined with such metal oxide sols as, for example, tin, iron, zirconium, tungsten, cobalt, nickel, and the like.

The alleged silica coated with titania or alumina, described in various patent publications, are shown to be stable only in an acidic environment. When the pH of these materials is adjusted to the alkaline side, gellation or precipitation occurs. Similarly, the alleged coatings placed on the particles of colloidal silica are not truly adherent coatings since, when subjected to ion exchange, the majority of the metal oxide alleged to be coated on the silica is readily removed.

By using the practices of the present invention, it is possible to produce sols of silica with a variety of sols of metal oxides which are relatively concentrated and are stable in both the acid and alkaline pH ranges.

THE INVENTION

The invention comprises a method of producing a stable alkaline metal oxide aqueous colloidal silica sol which comprises the steps of:

(a) forming a reaction mixture by mixing an hydrolyzable metal compound with an acidic, substantially ion-free colloidal silica sol which contains at least 5% by weight of silica in the presence of an anionic water-soluble stabilizing compound from the group consisting of anionic water-soluble surfactants and water-soluble carboxylic acid polymers whereby the formation of metal oxide is substantially prevented and the amount of hydrolyzable metal compound is sufficient to produce at least 0.5% by weight of metal oxide sol based upon silica content; and (b) adjusting the pH of the reaction mixture between 1.5-2.5; and then (c) raising the pH of the metal oxide/silica sol obtained in step (b) with a water-soluble amine to at least 8.5 whereby a stable alkaline metal oxide/silica sol is produced.

The invention is further concerned with stable sols of metal oxides and silica which are characterized as being stable in the alkaline pH range and contain an anionic compound from the group consisting of anionic water-soluble surfactants and water-soluble carboxylic acid polymers and a stabilizing amount of a water-soluble amine.

In a preferred embodiment of the invention, the metal oxide sol present in the sols is a sol of either titanium, iron, or tin. The preferred anionic compound is a water-soluble polymaleic acid, and the preferred water-soluble amine is an amine which contains at least a polar group in addition to the amine group.

The Hydrolyzable Metal Compound Used to Produce the Metal Oxide Sol

The metal compounds which, in the finished products of the invention are in the form of a metal oxide sol, may be selected from a wide number of metals. In addition to aluminum, they are preferably those metals contained in the first two full horizontal rows of the Periodic Table. Illustrative of such metals are titanium, zirconium, vanadium, chromium, molybdenum, and tungsten. Also capable of being made into the sols of the invention are the metals, manganese, iron, cobalt, nickel, lead, silver, platinum, zinc, mercury, tin.

A preferred group of metal oxide sols are the metal oxide sols of titanium, iron, and tin. The compounds of these metals used to prepare the sols should be capable of undergoing hydrolysis in an acidic aqueous environment. In most instances, the mineral acid anion salts of these compounds may be employed, thus, in the case of titanium, titanium tetrachloride is an ideal starting material. Rather than using the anhydrous inorganic salts of the metal oxide it is possible to utilize organo metallic species of these metals which are capable of hydrolyzing in acidified water to produce the corresponding oxide.

Further illustrative of starting compounds are tin tetrachloride, ferric nitrate, and the like. Other suitable compounds of these metals that may be used to prepare the finished compositions of the invention are described in the text, *The Hydrous Oxides*, by Weiser, McGraw-Hill Book Co., Inc., New York, NY, 1926.

The Starting Ion-Free Silica Sols

These materials are available commercially. A method for their preparation is described in U.S. Pat. No. 3,342,747, the disclosure of which is incorporated herein by reference.

A convenient starting ion-free sol for use in practicing the invention is the product, NALCOAG[1] 1034-A. Typical specifications of this material are set forth below:

| | |
|---|---|
| Colloidal Silica, as $SiO_2$ | 34% |
| pH | 3.1 ± 0.5 |
| Average Particle Size | 16-22 mu |
| Average Surface Area | 135-190 $M^2$/gram |
| Specific Gravity at 68° F. | 1.230 |
| Viscosity at 77° F. | 20 cp |
| $Na_2O$ | 0.05% |

[1]Registered trademark, Nalco Chemical Company

The concentration of the starting salt-free silica sol may be as little as 5% silica as $SiO_2$ or it may be higher, e.g. 25-40% by weight $SiO_2$. NALCOAG 1034A may be used as such as the starting silica sol.

The Water-Soluble Anionic Stabilizing Compound

These compounds may be selected from water-soluble anionic surfactants having an HLB greater than 8 or they may be selected from water-soluble carboxylic acid polymers which includes water-soluble homo and copolymers which contain up to at least 5% by weight of carboxylic acid functionality.

(a) The water-soluble anionic surfactants.

These materials are well known and are described in detail in McCutcheon's *Detergents & Emulsifiers*, 1974 North American Edition, Published by McCutcheon's Division, Allured Publishing Corporation, 45 North Broad Street, Ridgewood, NJ 07450, U.S. An illustration of such materials and preferred for use in the invention are the surfactants, Tamol SN (condensed naphthalene sulfonate, sodium salt) Conoco AXS (ammonium salt of xylene sulfonate), and Stepanate AM (ammonium salt of xylene sulfonate).

(b) The water-soluble carboxylic acid polymers.

The water-soluble carboxylic acid polymers are of low molecular weight and have a molecular weight below 1,000,000 and, in most instances, below 500,000. In a preferred embodiment, they are acrylic acid homo or copolymers or maleic acid homopolymers. Illustrative of such materials are set forth in Table I:

TABLE I

| Polymer | | Average Mol. Wt. |
|---|---|---|
| 1 | 3:1 acrylic acid/hydroxypropyl-acrylate copolymer | 4942 |
| 2 | 4:1 acrylic acid/ethylacrylate copolymer | 2000 |
| 3 | 4:1 acrylic acid/methylacrylate copolymer | 2500 |
| 4 | polyacrylic acid | 2600 |
| 5 | 3:1 acrylamide/acrylic acid copolymer | 9000 |
| 6 | 2:1 acrylic acid/acrylamide copolymer | 20,000 |
| 7 | acrylic acid, homopolymer | 6000 |
| 8 | maleic acid, homopolymer | 800–1000 |
| 9 | maleic acid, homopolymer | 800–1000 |
| 10 | acrylic acid, homopolymer with isopropanol content | 3260 |
| 11 | acrylic acid, homopolymer | 3150 |

The function of the anionic stabilizing compound is to prevent precipitation and gellation of the sols during the subsequent processing steps. Also, they tend to add additional stability to the final sols which have been rendered alkaline and stabilized by the addition of the water-soluble amine. They also allow acid stable sols to be produced.

The amount of water-soluble anionic compound used to practice the invention may be expressed in relation to the metal oxide to water-soluble anionic compound ratio. It may be as little as 0.3:1 and may be as high as 15:1. The particular amount required to stabilize the reactants may be readily determined by routine experimentation.

In addition to using individual water-soluble anionic compounds, they may be combined to produce improved stabilizing materials.

Addition of the Hydrolyzable Metal Oxide Compound to the Starting Ion-Free Silica Sol In this step, it is important that the anionic water-soluble compound be added to the starting ion-free silica sols prior to addition of the hydrolyzable compound of the metal oxide. The hydrolyzable compound of the metal oxide should be added to the silica sol under conditions which prevent conversion of the compound into its non-hydrous oxide form. In certain cases, such as when titanium tetrachloride is added to water, heat buildup should be avoided. External cooling may be required.

After the addition of the hydrolyzable water-soluble compound of the metal is placed int the colloidal silica sol, they should be mixed for between 1–10 hours. This insures complete hydrolysis of the metal compound to its hydrous metal oxide. The amount of metal compound should be sufficient to provide at least 1% of metal oxide up to 10.5% based on the silica content (expressed as $SiO_2$).

pH Adjustment with Anion Exchange Resin or by Ultrafiltration

The mixture of the hydrolyzed metal compound and colloidal silica has a pH of between 0.5 and 1. At this pH, the reaction mixture is unstable and would gel within a matter of hours after agitation had been stopped. It can be stabilized and used as such if it has previously been treated with the anionic stabilizing compound. The pH can also be raised, which is important and critical to the success of the invention, slowly by using either base, ultrafiltration, or a weak base anion exchange resin to remove acidity caused by the hydrolysis of the metal hydrolyzable compound.

When an anion exchange resin is utilized, it should, of course, be in the form that would not add acidity to the system after removing, for example, chloride ion, thus, strong based resins in the free-base form or weak base resins in a weak acid form, e.g. bicarbonate form, are preferred.

The various anion resins that may be used in the invention may be selected from a large number of such resins. There are several strong acid resins that are commercially available which can be used successfully in the subject process. One such product is sold under the trademarks, Nalcite HCR and Dowex 50. These products are described in U.S. Pat. No. 2,366,007. The resin is made by the aromatic sulfonation of styrene-divinyl benzene beads. Similarly, there are many strong base resins which can be used in the process. Examples of the materials include the commercially available Nalcite SBR, Dowex 1, Dowex 2, Dowex 11, and Dowex 21K. Nalcite SBR and Dowex 1 and 2 are described in U.S. Pat. No. 2,591,573. Each of the above exchange resins has a quaternary ammonium type of exchange group. The quaternary ammonium anion exchange resins are highly ionized and can be used over the entire pH range. They are capable of salt-splitting reactions which convert a neutral salt to its corresponding base. A typical weak base anion exchange resin that can be used in the process is "Amberlite IR-4B" which is modified phenolformaldehyde polyamine condensate containing 14% nitrogen and 39.9% water in the basic form of the resin and having an exchange capacity of 10 milli-equivalents per gram of resin. The properties of the resin are described by Kunin and Meyers in the Journal of the American Chemical Society, vol. 69, p. 2874, for 1947. Other anion exchangers are described in U.S. Pat. Nos. 2,422,054 and 2,438,230.

The preferred method of adjusting the pH is to remove the salts by means of ultrafiltration. When this technique is used, it is desirable that the above described reaction mixture be diluted to about 15% or less by weight of solids. Ultrafiltration is a known technique and is described in the bibliography of *Literature References to the Use of Amicon Ultrafiltration Systems*, Publication No. 428E, 1977, Amicon Corporation.

When either the anion exchange technique, base addition, or the ultrafiltration procedure is used for pH adjustment, it should be done slowly. For example, the process should take between 1 and 10 hours. Rapid pH adjustment will cause a precipitate to occur. The pH is adjusted so that it is at least 1.5, but it should not exceed about 3 and, preferably, should be between 1.5 and 2.5.

The Final pH Adjustment with Water-Soluble Amines

The sols treated in the preceding step are metastable and require further treatment to enhance their stability. This is accomplished by adjusting the pH to at least 8.5, preferably within the range of 8.5–12.5 and, most preferably, 9–11.5.

The pH adjustment is accomplished using a water-soluble amine. While any water-soluble amine can be used, it is preferred to use those water-soluble amines which contain a polar group in addition to the amino group of the compound. Thus, amino compounds containing hydroxyl groups, one or more amino groups, oxygen groups, and the like are preferred. A most preferred group of amines are the compounds, diethylaminoethanol, ethylenediamine, and aminoethylethanolamine, with diethylaminoethyl being the preferred species.

Illustrative of other water-soluble amines that may be used are the following: methylamine, dimethylamine, trimethylamine, ethylamine, diethylamine, triethylamine, n-propylamine, di-n-propylamine, tri-n-propylamine, n-butylamine, n-amylamine, trimethylenediamine, tetramethylenediamine, pentamethylenediamine, and hexamethylenediamine.

Utility

The sols of the invention are useful in a variety of industrial applications. For instance, the titania and silica sols may be used as pigments in coating composition. The chromium, molybdenum, tungsten, cobalt, and nickel sols are useful in the production of petroleum hydrotreating catalysts. The copper, silver, and iron sols are useful in producing electronic magnetic tape devices and electrically conductive coatings on a variety of substrates. The alumina sols are useful for many applications such as, for instance, those described in U.S. Pat. No. 3,007,878. In many instances, the sols of titanium, zirconium, tungsten, iron, and nickel can be used to produce a variety of specialized ceramic products.

The processes of the invention provide two new metal oxide/silica sol compositions. The first is a stable acidic metal oxide/silica sol which contains from 5–40% by weight $SiO_2$, from 1–10.5% by weight of metal oxide, and a water-soluble anionic stabilizing compound selected from the group consisting of water-soluble anionic surfactants having an HLB greater than 8 and water-soluble carboxylic acid polymers with the ratio of metal oxide to water-soluble anionic stabilizing compound being within the range of 0.3:1 to 15:1.

Of the above metals, the metal oxide is preferably titania and the preferred anionic stabilizing compound is a water-soluble carboxylic acid polymer of the type previously described. As previously indicated, most metal oxide silica sol compositions described in the prior art are acidic in order to maintain stability, yet pH alone is normally not sufficient to produce stability of a sufficient degree to render the materials commercially attractive. The acidic sols which, as described above, have a pH between 1.5–3, are stable for long periods of time when they are stabilized with the water-soluble anionic stabilizing compound.

The finished alkaline sols of the invention are unique since, for the first time, it is possible to utilize sols of the type described which have an alkaline pH within the ranges previously set forth. As indicated by prior art, attempts to adjust the pH of the sols described to an alkaline range results in instant gelation or instability in the form of voluminous precipitation.

The stable aqueous alkaline metal oxide/silica sols may be characterized as containing from 5–40% by weight $SiO_2$, from 1–10.5% by weight of metal oxide, and a water-soluble anionic stabilizing compound selected from the group consisting of water-soluble anionic surfactants having an HLB greater than 8 and water-soluble carboxylic acid polymers with the ratio of metal oxide to water-soluble anionic stabilizing compound being within the range of 0.3:1 to 15:1. These sols have an alkaline pH of at least 8.5, preferably 8.5–12.5, and most preferably 9–11.5. This alkaline pH is achieved by the addition to the sol of the water-soluble amines previously described.

The preferred stabilizing agent is diethylamino ethanol with the preferred metal oxide being titania.

To illustrate the invention, the following are given by way of example:

EXAMPLES

Titania-Silica Sols

EXAMPLE 1

The titanium/silica sol was prepared at a 15:1 ratio of silicon dioxide to titanium dioxide. A single dispersant was utilized at a titanium dioxide to dispersant ratio of 8.8:1. Surfactant A* was the dispersant used here. The colloidal silica was NALCOAG 1034-A.

*Surfactant A is a condensed naphthalene sodium sulfonate.

The colloidal silica (600 gm) was diluted and chilled with ice to a temperature of 5° C. The dispersant (1.54 gm) was introduced and dissolved in the solution. The titanium was added as the anhydrous tetrachloride salt (32 gm as titanium tetrachloride, 0.17 moles) dropwise while maintaining the temperature at 10° C. Once the tetrachloride had been completely hydrolyzed, the mixture was diluted to approximately 5% solids by weight and diafiltered. The retentate had a pH of 2.5 and a conductance of 2300 umhos/cm. Alkalization of the retentate was accomplished with diethylaminoethanol (DEAE) to a pH of 10.3. The sol was then concentrated to 15.3% solids. The concentrated product had a pH of 10.6 and a conductance of 1460 umhos/cm.

EXAMPLE 2

The titanium/silica sol was prepared at a silicon dioxide to titanium dioxide ratio of 19.0. A single dispersant, Polymer 1[1], was used at a titanium dioxide to dispersant ratio of 4.7.

[1] For description of Polymers, see Table I. The silica was derived from NALCOAG 1034-A.

The colloidal silica (412 gm) and water (100 gm) were mixed and chilled to 5° C. with ice. The resulting sol was treated with Polymer 1(3.13 gm). The titanium tetrachloride, anhydrous (17.3 gm, 0.09 moles) is added gradually to the mixture so that the temperature does not exceed 20° C. Once addition is complete, the mixture is heated to 80° C. for 10 minutes. The resulting product is air cooled prior to diafiltration. The resulting retentate had a pH of 1.9 and a conductance of 2000 umhos/cm. This is alkalized with DEAE to a pH of 9.8. The product had a conductance of 1525 umhos/cm at 20% by weight total solids.

EXAMPLE 3

The titanium/silica sol was prepared at a silicon dioxide/titanium dioxide ratio of 9.4. A single dispersant was used at a titanium dioxide to dispersant ratio of 9.4. The dispersant was Polymer 1. The silica was derived from NALCOAG 1034A.

The colloidal silica (40.9 gm) and water (50.8 gm) were chilled to 5° C. with ice. Polymer 1 (0.31 gm) was introduced with good mixing. This was followed by gradual addition of titanium tetrachloride, anhydrous (3.48 gm, 0.018 moles). At no time did the reaction mixture temperature exceed 20° C. Once addition was complete, the mixture was heated to 70° C. for 15 minutes. This was followed by air cooling. At this point, the reaction mixture was diluted and diafiltered. This yielded a retentate with a pH=2.4 and conductance of 3000 umhos/cm. DEAE adjusted the retentate to a pH=10.0 and yielded a conductance of 1930 umhos/cm. It had a total solids of 16.6% with 1% as titanium dioxide.

EXAMPLE 4

The titanium/silica sol was prepared at a silicon dioxide/titanium dioxide ratio of 6.35. A single dispersant was used within the formulation. The dispersant was Polymer 1. The dispersant was used at a titanium dioxide to dispersant ratio of 9.5. The colloidal silica was derived from NALCOAG 1034-A.

The colloidal silica (448 gm) and water (564 gm) were chilled with ice to 5° C. The titanium tetrachloride anhydrous, (60 gm, 0.32 moles) was added dropwise with good mixing to the colloidal silica solution. The solution was maintained between 15°–20° C. Upon complete hydrolysis of the titanium tetrachloride, the reaction mixture was heated to 70° C. Once the reaction mixture attained 70° C., it was air cooled and diluted to approximately 3% total solids. The resulting solution was diafiltered to lower the conductance. The retentate had a pH of 2.6 and a conductance of 2540 umhos/cm. DEAE was used to alkalize the retentate to a pH of 10.6. The mixture was then concentrated to obtain a final product of 14.4% total solids with 2.0% as titanium dioxide. The final pH was 10.4 and the conductance was 1610 umhos/cm.

EXAMPLE 5

The titanium/silica sol was prepared from anhydrous titanium tetrachloride and NALCOAG 1034-A. The silicon dioxide to titanium dioxide ratio was 6.0. A single dispersant was used to stabilize during processing and as a final product. This dispersant was Polymer 7. The titanium dioxide to dispersant ratio was 9.56.

Polymer 7 was diluted with 100 gm of water and added to 452 gm of NALCOAG 1034-A. To this solution, ice was added to bring the temperature to approximately 5° C. The mixture was held at this temperature during the addition of the anhydrous titanium tetrachloride (60 gm, 0.32 moles). Upon complete addition of the titanium tetrachloride, the reaction mixture was gradually heated to 85° C. It was maintained at this temperature for a period of approximately 10 minutes whereupon it was air cooled to 40° C. Once at 40° C., the mixture was further diluted and diafiltered. The retentate thus formed had a pH of 2.5 and a conductance of 2510 umhos/cm. Diethylaminoethanol was used to alkalize the retentate to a pH of 10.1. The conductance of the alkalized retentate was 1420 umhos/cm. The alkalized retentate was concentrated to a 15.3% sol of which 2% of this was titanium dioxide. The final pH was 10.1 and the final conductance was 2100 umhos/cm.

EXAMPLE 6

The titanium/silica sol was prepared utilizing two dispersants to impart stability during and after synthesis. The first dispersant was Polymer 7. The titanium dioxide to Polymer 7 ratio was 9.51. The second dispersant was Surfactant B*. The titanium dioxide to Surfactant B ratio was 2.13. Anhydrous titanium tetrachloride was used as a source of the titanium while NALCOAG 1034-A was the source of the colloidal silica. The silicon dioxide to titanium dioxide ratio was 6.04. In this example, no temperature control during the hydrolysis of the titanium tetrachloride was attempted.

*Surfactant B is xylene ammonium sulfonate.

The NALCOAG 1034-A (452 gm) was diluted with 700 ml of water. The dispersants (Polymer 7, 9.6 gm, and Surfactant B, 30 gm) were dissolved in 100 gm of water and added to the colloidal silica solution. At this point, the anhydrous titanium tetrachloride (60 gm, 0.32 moles) was added dropwise with good agitation over approximately 6 minutes. The hydrolysis of the titanium tetrachloride resulted in a temperature increase from approximately 24° C. to 36° C. Upon complete addition of the titanium tetrachloride, the mixture was heated on a hot plate to 75° C. for 15 minutes. After this time, the sol was gradually cooled to 65° C. over 40 minutes. The mixture was then diluted and diafiltered. The resulting retentate had a pH of 3.1 and a conductance of 151 umhos/cm. Diethylaminoethanol was used to alkalize the retentate to a pH of 9.8. This yielded a conductance of 632 umhos/cm. The alkalized retentate was then concentrated to a solution with total solids of 11.5% of which 1.6% was titanium dioxide. The final pH was 9.3, and the final conductance was 1575 umhos/cm.

EXAMPLE 7

The titanium/silica sol was prepared utilizing a single dispersant for stabilization. The dispersant was Polymer 7. The titanium dioxide to dispersant ratio was maintained at 8.5. Anhydrous titanium tetrachloride was the source of titanium and NALCOAG 1034-A was the source of colloidal silica. The silicon dioxide to titanium dioxide ratio was 6.0. No temperature control was attempted during the addition and hydrolysis of the anhydrous titanium tetrachloride.

The NALCOAG 1034-A (452 gm) was diluted with water (700 gm). In a similar manner, the dispersant, Polymer 7, was diluted with 100 gm of water. The dispersant solution was added to the colloidal silica sol. The anhydrous titanium tetrachloride (60 gm, 0.32 moles) was then added dropwise to the colloidal silica solution. The rate of addition was approximately 11 gm per minute. The mixture temperature rose from 24° C. to a final temperature of 38° C. Upon complete addition of the anhydrous titanium tetrachloride, the mixture was heated to a temperature of 82° C. It was held at this temperature for 3 minutes and then allowed to air cool. Upon cooling, the reaction mixture was diluted and diafiltered. The retentate thus formed had a pH of 2.7 and a conductance of 344 umhos/cm. Diethylaminoethanol was used to alkalize the retentate to a pH of 10.3. The resulting conductance was 678 umhos/cm. This dilute, alkalized titanium/silica sol was then concentrated to a final solids of 15.5% of which 2.2% was titanium dioxide. The final pH was 10.0 and the final conductance was 1790 umhos/cm.

Example 8

The titanium/silica sols utilized a single dispersant for stabilization. This dispersant was Polymer 7. The titanium dioxide to dispersant ratio was 8.8. Aqueous titanyl sulfate solution (12% as titanium dioxide) was used as the source of titanium, and the colloidal silica was derived from NALCOAG 1034-A. The silicon dioxide to titanium dioxide ratio was maintained at 5.9.

The NALCOAG 1034-A (45 gm) was diluted with 56 gm of water. This dilute colloidal silica solution was then treated with the dispersant, Polymer 7 (1.06 gm) and aqueous concentrated nitric acid (10 gm). To this solution was then added the aqueous titanyl sulfate solution (21.5 grams, 2.6 grams as titanium dioxide). The resulting reaction mixture was then heated to 95° C. for 1 minute and air cooled to 40° C. At 40° C., the reaction mixture was diluted and diafiltered at approximately 3% solids. The resulting retentate had a pH of 2.8 and a conductance of 1240 umhos/cm. Diethylaminoethanol was used to alkalize the retentate to a pH of 10.9. This yielded a conductance of 1088 umhos/cm. The resulting sol was a blue opalescent, stable titanium/silica sol.

EXAMPLE 9

The titanium/silica sol was prepared from an organotitanate and NALCOAG 1034-A. The organotitanate was Tyzor TPT, trademark of duPont, which is chemically the tetrapropyl titanate. A ratio of silicon dioxide to titanium dioxide of 6.12 was used. A single dispersant was used to provide stability at various stages. The dispersant was Polymer 8. The ratio of titanium dioxide to Polymer 8 was 5.43.

The organotitanate (10 gm of Tyzor TPT, 28% as titanium dioxide or 0.035 moles) was added to glacial acetic acid (20 gm) with good mixing. In turn, this solution was added to 70 gm of water. In the meantime, the NALCOAG 1034-A (45 gm) was mixed with 1 gm of Polymer 8. The organotitanate solution was then added to the NALCOAG 1034-A solution. The resulting material was diluted further and diafiltered. The thus formed retentate had a pH of 3.3 and a conductance of 39 umhos/cm. Diethylaminoethanol was used to alkalize the resulting retentate to a pH of 11.0. The resulting conductance was 856 umhos/cm.

EXAMPLE 10

The titanium/silica sol was prepared utilizing a single dispersant. The dispersant used to stablize the sol was Polymer 8 (see table for chemical description). The titanium dioxide to dispersant ratio was maintained at 10.6. NALCOAG 1034-A was used as a source of colloidal silica. The silicon dioxide to titanium dioxide ratio was held at 4.5. The titanium salt used in this preparation was anhydrous titanium tetrachloride. No temperature control was attemped during the addition and hydrolysis of the titanium tetrachloride.

The NALCOAG 1034-A (45 gm) was diluted with 55 gm of water. To this diluted colloidal silica solution was added the dispersant, Polymer 8 (0.7 gm). This was followed by a slow dropwise addition of the anhydrous titanium tetrrachloride (8 gm, 0.043 moles) at a rate such that the temperature of the reaction mixture never exceeded 35C. Upon complete addition of anhydrous titanium tetrachloride, the mixture was heated to 85C for 3 minutes and then air cooled. On cooling, the solution was then reheated to 95C for 2 minutes. Following air cooling to 40C., the mixture was diluted to approximately 3% solids and diafiltered. A retentate was obtained with a pH of 2.2 and a conductance of 5946 umhos/cm. Diethylaminoethanol was used to alkalize the retentate to a pH of 10 .6. The resulting conductance was 1745 umhos/cm.

EXAMPLE 11

The titanium/silica sol was prepared from anhydrous titanium tetrachloride and NALCOAG 1034-A. The ratio of the silicon dioxide to titanium dioxide was 4.5. A single dispersant was used in preparing this sol. The dispersant used here was Polymer 9. The ratio of titanium dioxide to disperssant was 10.6.

The NALCOAG 1034-A (45 gm) was diluted with 55 gm of water. The dispersant Polymer 9 (0.64 gm) was added to the NALCOAG 1034-A. Finally, 8 gm (0.043 moles) of anhydrous titanium tetrachloride was introduced in a dropwise manner. The addition rate was such that the mixture temperature did not exceed 35C. Upon complete addition of the anhydrous titanium tetrachloride, the reaction mixture was heated to 95C for 3 minutes. This was followed by air cooling, and dilution to approximately 3% total solids. The resulting retentate has a pH of 2.8 and a conductance of 470 umhos/cm. Diethylaminoethanol was used to alkalize the retentate to a pH of 11.0. The resulting conductance of the alkalized sol was 780 umhos/cm.

EXAMPLE 12

The titanium/silica sol was prepared from duPont's organotitanate Tyzor TPT, and NALCOAG 1034-A. The Tyzor TPT is the tetrapropyl titanate. The silicon dioxide to titanium dioxide ratio was 7.5. A single dispersant was used throughout the synthesis. The dispersant was Polymer 8 (see table for chemical discription). The titanium dioxide to dispersant ratio was 6.04.

The Tyzor TPT (71 gm of 28% as titanium oxide or 0.89 moles) was added to 143 gm of glacial acetic acid. In the meantime, the NALCOAG 1034-A (441 gm) was diluted with 400 gm of water and treated with 7.2 gm of Polymer 8. At this point, the glacial acetic acid-Tyzor TPT mixture was added to 497 gm of water with good mixing. Finally the organotitanate solution was added with good mixing to the diluted silica sol. Upon complete addition, the reaction mixture was divided into two portions.

The first portion was diluted by 50% and diafiltered. The resulting retentate had a pH of 3.4 and a conductance of 185 umhos/cm. This product was then alkalized with diethylaminoethanol to a pH of 10.0 and a conductance of 1854 umhos/cm.

The second portion was also diluted and diafiltered. The resulting retentate had a pH of 3.2 and a conductance of 311 umhos/cm. As above, diethylaminoethanol was used to alkalize the retentate to a pH of 10.0. The resulting conductance was 3560 umhos/cm.

The first and second portions of the alkalized retentate were combined and concentrated. The final colloidal product had a total solids of 11.5% of which 1.2% was titanium dioxide. The final product had a pH of 10.8 and a conductance of 2700 umhos/cm.

EXAMPLE 13

The titanium/silica sol was prepared from technical grade anhydrous titanium tetrachloride and NAL-COAG 1034-A. The silicon dioxide to titanium dioxide ratio was 9.37. A single dispersant was used in preparing the stabilized sol. The dispersant was Polymer 8 (see table for chemical dscription). The titanium dioxide to dispersant ratio was 9.45. The temperature was not controlled during the hydrolysis of the anhydrous titanium tetrachloride.

The NALCOAG 1034-A (500 gm) was diluted with 580 gm of water. In the meantime, the Polymer 8 (4 gm) was diluted to a total weight of 20 gm with water. The Polymer 8 solution was then added to the colloidal silica solution. With good mixing, anhydrous titanium tetrachloride was introduced at approximately 10 gm/min. (i.e., 44.4 gm in 5 minutes, 0.24 moles). The mixture temperature gradually increased to 36° C. during the addition of the anhydrous titanium tetrachloride. Following the addition, the mixture was heated to 75° C. for 32 minutes. Finally, it was air cooled and diluted. The resulting sol was divided into two portions.

Diafiltration of the first portion yielded a retentate with pH of 2.6 and conductance of 2800 umhos/cm. Diethylaminoethanol was used to stabilize the retentate to a pH of 10.1. The resulting sol had a conductance of 1130 umhos/cm.

Diafiltration of the second portion resulting retentate had a pH of 2.0 and a conductance of 3740 umhos/cm. Again, diethylaminoethanol was used to stabilize and alkalize the retentate to a pH of 10.0. The resulting conductance was 1300 umhos/cm.

The two portions were combined and concentrated to a final product. This final product had a total solids of 14.7% of which 1% was titanium dioxide. The final pH was 9.9 and conductance was 1790 umhos/cm.

EXAMPLE 14

The titanium/silica sol was prepared from aqueous titanium tetrachloride solution (50% as titanium tetrachloride) and NALCOAG 1034-A. The ratio of silicon dioxide to titanium dioxide was 17.94. A single dispersant was Polymer 8 (see table for chemical description). The ratio of titanium dioxide to dispersant was 1.58.

The NALCOAG 1034-A (470.6 gm) was treated with 11.28 gm of Polymer 8 diluted with 50 gm of water. This mixture was further diluted with 500 gm of water. The aqueous titanium tetrachloride solution (41.96 gm solution, 20.98 gm titanium tetrachloride, or 0.11 moles) was added do the colloidal silica over a 30-second period (i.e., 10 gm/sec.). The temperature did not increase during this addition. The resulting mixture was then gradually warmed to 70° C. for 30 minutes. At the end of this period, the reaction mixture was divided into two portions.

The first portion was diluted and diafiltered. The resulting retentate had a pH of 2.8 and a conductance of 3000 umhos/cm. Diethylaminoethanol was used to alkalize the retentate to a pH of 10.5. The resulting conductance was 1200 umhos/cm.

The second portion of the reaction mixture was further subdivided into two parts. The first part was diluted and diafiltered. The resulting retentate had a pH of 2.8 and a conductance of 2110 umhos/cm. Again, diethylaminoethanol was used to alkalize the retentate to a pH of 10.0. The conductance was 742 umhos/cm. The second part of this portion of the mixture was also diluted and diafiltered. The resulting retentate had a pH of 2.9 and a conductance of 550 umhos/cm. Again, diethylaminoethanol was used to alkalize the retentate to a pH of 10.0 yielding a conductance of 565 umhos/cm.

Both portions were combined and concentrated to a total solids of 14.4% of which 0.7% was titanium dioxide. The final pH was 9.6, and the final conductance was 2190 umhos/cm.

EXAMPLES

IRON SILICA SOLS

EXAMPLE 15

The iron/silica sol was prepared at a silicon dioxide to ferric oxide ratio of 40.0. A single dispersant, Polymer 2 was used to impart stability during processing as well as to the final product (see table for chemical description). The ferric oxide to dispersant ratio was 0.54. The iron was derived from the hydrated ferric nitrate salt and the colloidal silica from NALCOAG 1034-A.

The colloidal silica (440 gm) was diluted with 200 gm of water. The hydrated ferric nitrate (18.93 gm or 0.047 moles) was dissolved in this colloidal silica solution. The mixture was gradually heated to a temperature of 60° C. Meanwhile, the dispersant (Polymer 2, 33 gm) was diluted with 400 gm of water. The dispersant solution was introduced to the colloidal silica/iron mixture gradually and with good mixing. The temperature was returned to 60° C. and maintained there for 15 minutes. After this time, the solution was air cooled and diluted to approximately 5% solids. This was diafiltered. The retentate thus formed had a pH of 3.5 and conductance of 235 umhos/cm. Both diethylaminoethanol and ammonium hydroxide were found to stabilize the retentate at alkaline pH. Concentrated aqueous ammonium hydroxide of 0.19. The sample was concentrated to a final concentration of 12.2% total solids with 0.3% as ferric oxide. The final pH was 9.8 and the conductance was 4770 umhos/cm.

EXAMPLE 16

The iron/silica sol was prepared at a silicon dioxide to ferric oxide ratio of 14.3. A single dispersant, Polymer 2, provided stability during processing and in the final product (see table for description). The ferric oxide to dispersant ratio was 2.02. The iron was derived from the hydrated ferric nitrate salt. The colloidal silicon dioxide was derived from NALCOAG 1034-A.

The colloidal silica (588 gm) was diluted with 300 gm of water. This mixture was used to dissolve the ferric nitrate salt (70.7 gm, 0.18 moles). The reaction mixture was heated to 60° C. Simultaneously, the Polymer 2 (33 gm) was diluted threefold (i.e., with 100 gm of water). The solution of Polymer 2 was then added with good mixing to the silica sol/ferric nitrate mixture. Upon complete addition, the reaction mixture was again heated to 60° C. and maintained at that temperature for 5 minutes. The reaction mixture was then air cooled to 30° C., diluted to a total solids of approximately 3%, and diafiltered. The retentate had a pH of 2.6 and a conductance of 4880 umhos/cm. Treatment of the retentate with concentrated aqueous ammonium hydroxide resulted in gelatin. However, treatment of the retentate with diethylaminoethanol yielded a clear, stable, alkalized sol. The retentate was, therefore, treated with DEAE to a pH of 10.6. The resulting conductance was 1870 umhos/cm. This solution was then concentrated to 20% solids with 1.3% of that as ferric oxide. The final pH was 10.6 and the conductance was 3810 umhos/cm.

EXAMPLE 17

The iron/silica sol was prepared from hydrated ferric nitrate and NALCOAG 1034-A. The silicon dioxide to ferric oxide ratio was 7.08. The sol utilized a single dispersant, Polymer 2 (see table for chemical description), to provide in-process and final product stability. The ferric oxide to dispersant ratio was 0.952.

The colloidal silica (500 gm) was diluted with 500 gm of water. Hydrated ferric nitrate (120 gm, 0.30 moles) was then added and mixed until dissolved. The resulting reaction mixture was heated to 60° C. Simultaneously, Polymer 2 (119 gm) was diluted with 500 gm of water. The dispersant solution was added with good mixing to the mixture at 60° C. Upon complete addition of the dispersant solution, the mixture was maintained at 60° C. for 15 minutes. This was followed by air cooling to 30° C. The resulting mixture was diluted to approximately 3% solids by weight and diafiltered. The retentate had a pH of 3.2 and a conductance of 657 umhos/cm. A portion of the retentate was alkalized with concentrated aqueous ammonium hydroxide. This sample gelled on standing. The remainder was alkalized using diethylaminoethanol (DEAE) to a pH of 10.1. The conductance was to 4270 umhos/cm. The resulting alkalized retentate was concentrated to a final total solids of 10% by weight with 1.2% as ferric oxide. The final pH was 9.9 and the conductance was 5410 umhos/cm.

EXAMPLE 18

The iron/silica sol was prepared from hydrated ferric nitrate and NALCOAG 1034-A. The silicon dioxide to ferric oxide ratio was established at 7.14. A single dispersant, Polymer 2, was used in this formulation for stabilization (see table for chemical description). The ferric oxide to dispersant ratio was established at 0.54.

The colloidal silica (588 gm) was initially diluted with 650 gm of water. To this mixture was added the ferric nitrate salt (143 gm, 0.35 moles). The resulting mixture was heated to 60° C. Meanwhile, the Polymer 2 (250 gm) was diluted with 250 gm of water. The dispersant solution was gradually added to the colloidal silica mixture above while maintaining the solution temperature at 60° C. Upon completing the addition of the dispersant, the mixture was further heated at 60° C. for 15 minutes. The reaction mixture was then air cooled to 40° C. and diluted to approximately 5% total solids. The diluted reaction mixture was then diafiltered. The retentate thus formed had a pH of 3.0 and a conductance of 1150 umhos/cm. Diethylaminoethanol was used to alkalize the retentate. The alkalized retentate was 9.4 and a conductance of 7570 umhos/cm. The dilute retentate was then concentrated to 14.5 solids, 2% of which was ferric oxide. The final pH was 9.1, and the final conductance was 8740 umhos/cm.

EXAMPLE 19

The iron/silica sol was prepared from hydrated ferric nitrate and NALCOAG 1034-A. The ratio of silicon dioxide to ferric oxide was established at 7.07. A single dispersant, Polymer 2, was used in the manufacture of this sol (see table for chemical description). The ferric oxide to dispersant ratio was maintained at 1.5.

The NALCOAG 1034-A (588 gm) underwent a dilution with 500 gm of water prior to the addition of the hydrated ferric nitrate (143 gm, 0.35 moles). Upon dissolution of the ferric nitrate, the mixture was heated to 60° C. Simultaneously, the dispersant (Polymer 2, 90 gm) was diluted with 500 gm of water and gradually added to the ferric nitrate containing mixture. The resulting mixture was heated to 80° C. and maintained at that temperature for 5 minutes. After this time, the reaction mixture was air cooled to 40C. A further dilution was carried out to a final overall 5% total solids. The retentate thus formed had a pH of 2.8 and a conductance of 4000 umhos/cm. Treatment of a portion of the retentate with concentrated aqueous ammonium hydroxide caused gellation of the retentate. In contrast, treatment of a portion of the retentate with diethylaminoethanol (DEAE) yielded a stable, clear colloid. Therefore, DEAE was used to alkalize the remaining retentate. The alkalization proceeded to a pH of 10.4. The resulting conductance of the retentate was 5310 umhos/cm. The retentate was then concentrated to 18.3% total solids of which 2.2% was ferric oxide. The final pH was 10.3 and the final conductance was 5200 umhos/cm.

EXAMPLE 20

The iron/silica sol was prepared from ferric chloride hexahydrate and NALCOAG 1034-A. The silicon dioxide to ferric oxide ratio was established at 7.07. A single dispersant, Polymer 2, was used (see table for chemical description). The ferric oxide to dispersant ratio was established at 1.50.

The colloidal silica (588 gm) was diluted with 500 gm of water. The ferric chloride hexahydrate (95.6 gm, 0.35 moles) was dissolved in the dilute silica solution. The resulting mixture was heated to 80° C. In like manner, the dispersant (Polymer 2, 90.0 gm) was diluted with 500 gm of water and added to the above mixture. The temperature was maintained at 80° C. for 5 minutes upon complete addition of the dispersant. The resulting reaction mixture was air cooled to 40° C. and diluted to approximately 5% solids for diafiltration. The resulting retentate was alkalized with diethylaminoethanol to a pH of 10.3. The resulting conductance was 2300 umhos per centimeter. The product was concentrated to a final total solids of 16.1% of which 2.0% was ferric oxide. The final pH was 10.1 and the final conductance was 5000 umhos/cm.

EXAMPLE 21

The iron/silica sol was prepared from ferric sulfate, nanohydrate, and NALCOAG 1034-A. The silicon dioxide to ferric oxide ratio was 7.14. This iron/silica sol was stabilized by a single dispersant, Polymer 5 (see table for chemical description). The ferric oxide to dispersant level was established at 1.50.

The colloidal silica (50 gm) was diluted with 50 gm of water. To this mixture was added the hydrated ferric sulfate (8.4 gm, 0.015 moles). The solution was then heated to 70° C. In the meantime, the dispersant (Polymer 5) was diluted with 50 gm of water. The dispersant solution was gradually added to the ferric sulfate solution above. Upon completing the addition of the dispersant, the reaction mixture was heated to 100° C. and maintained at that temperature for 5 minutes. The mixture was then air cooled and diafiltered. The retentate thus formed had a pH of 3.7 and a conductance of 130 umhos/cm. The retentate was alkalized with diethylaminoethanol to a pH of 11.1 yielding a conductance of 954 umhos/cm.

EXAMPLE 22

The iron/silica sol was prepared from ferric sulfate, nanohydrate and NALCOAG 1034-A. The silicon dioxide to ferric oxide ratio was etablished at 7.14. A single dispersant, Polymer 6, was used in the preparation of this sol (see table for chemical description). The ferric oxide to dispersant ratio was 1.50.

The colloidal silica (50 gm) was diluted with 50 gm of water. To this was added the hydrated ferric sulfate (8.4 gm, 0.015 moles). This solution was then gradually heated to 70° C. In the meantime, the dispersant (Polymer 6, 5.16 gm) was diluted with 50 gm of water. The dispersant solution was then added gradually to the above ferric sulfate solution. Following this, the mixture was heated to 100° C. and for 5 minutes. Finally, the solution was air cooled and diafiltered. The retentate thus formed has a pH of 3.4 and a conductance of 227 umhos/cm. This retentate was alkalized with diethylaminoethanol to a pH of 10.9. This yielded a conductance of 1440 umhos/cm.

EXAMPLE 23

The iron/silica sol was prepared from ferric nitrate nanohydrate and NALCOAG 1034-A. The ratio of silicon dioxide to ferric oxide was 7.05. Stabilization of the iron/silica sol was ensured with the use of a single dispersant. The dispersant used here was Polymer 9 (see table for chemical description). The ratio of ferric oxide to dispersant was 1.0.

The ferric nitrate (9.5 gm, 0.024 moles) was dissolved in 90.5 gm of water. The resulting solution was heated 98C. Simultaneously, 39 gm of NALCOAG 1034-A was mixed with the dispersant (i.e. Polymer 9, 3.76 gm) and diluted with 50 gm of water. This solution was also heated to 98° C. Subsequently, the colloidal silica containing solution was mixed with the ferric nitrate solution and maintained at 90° C. for 3 minutes. Upon air cooling, the reaction mixture was diafiltered. The resulting retentate had a pH of 4.1 and a conductance of 22.2 umhos/cm. Diethylaminoethanol was used to alkalize a portion of the retentate to a pH of 10.5. This yielded a conductance of 1883 umho/cm. Additionally, a portion of the retentate was alkalized with aminoethylethanolamine to a pH of 10.3. The resulting conductance of this colloidal iron oxide was 1660 umhos/cm.

EXAMPLE 24

The iron/silica sol was prepared from ferric nitrate nanohydrate and NALCOAG 1034-A. The ratio of silicon dioxide to iron oxide was at 7.05. A single dispersant was used in the preparation of the sol. The dispersant was Polymer 9 (see table for chemical description). The ratio of ferric oxide to dispersant was maintained at 1.25.

The ferric nitrate (9.5 gm. 0.024 moles) was dissolved in 90.5 gm of water. This solution was then heated to 98° C. A second solution was prepared utilizing 39 gm of NALCOAG 1034-A and 50 gm of water. The dispersant (Polymer 9, 3 gm) was added to this second solution with good mixing. Finally, the silica solution was added with good mixing to the ferric nitrate solution. The resulting reaction mixture was heated to 98° C. for 3 minutes. Upon air cooling, the reaction mixture was diafiltered. The resulting retentate had a pH of 2.9 and a conductance of 240 unhos/cm. Alkalization with diethylaminoethanol to a pH of 10.5 yielded a final conductance of 1503 umhos/cm. A second portion of the retentate was treated with aminoethylethanolamine to a pH of 10.8. This alkalized solution had a conductance of 1338 umhos/cm. Both sols remained clear and stable.

EXAMPLE 25

The iron/silica sol was prepared from ferric nitrate nanohydrate and NALCOAG 1034-A. The ratio of silicon dioxide to ferric oxide was 7.07. A single dispersant was used in the preparation of the sol. The dispersant was Polymer 10 (see table for chemical description). The ratio of ferric oxide to dispersant was maintained at 1.25.

The ferric nitrate (143 gm) was dissolved in 1362 gm of water and heated to 98° C. During this time, Polymer 10 (48 gm) was dissolved in 150 gm of water. The diluted dispersant solution was then added to the NALCOAG 1034-A (588 gm). This latter solution was then added to the ferric nitrate solution at 98° C. The resulting mixture was maintained at 98° C. for 15 minutes and then air cooled. Upon reaching a temperature of 40° C., the mixture was diluted and diafiltered. The retentate thus formed had a pH of 3.0 and a conductance of 520 umhos/cm. A portion of the sample was treated with diethylaminoethanol to a pH of 10.5. This yielded a clear sol with a conductance of 3010 umhos/cm. A second portion was treated with aminoethylethanolamine to yield a clear sol with a pH of 10.4 and conductance of 2580 umhos/cm. The remaining retentate was alkalized with diethylaminoethanol to a pH of 10.5 and a conductance of 3070 umhos/cm.57. This was concentrated to a total solids of 15.9% of which 1.5% was ferric oxide. The final pH was 10.0 and conductance was 5770 umhos/cm.

EXAMPLES

TIN-SILICA SOLS

EXAMPLE 26

The tin/silica sol was prepared from anhydrous tin tetrachloride and NALCOAG 1034-A. A single dispersant was used in the preparation of the alkalized product. This dispersant was Polymer 8 (see Table for chemical description). The silicon dioxide to tin dioxide ratio was 5.0. The ratio of tin dioxide to dispersant was 19.0.

NALCOAG 1034-A (41.7 gm) was diluted with 50.9/gm of water and treated with the dispersant (0.3 gm of Polymer 8). The anhydrous tin tetrachloride (5 gm or 0.019 moles of 2.5 gm/.min.) was added to this mixture in a dropwise manner over a period of approximately 2 minutes. Temperature was not controlled during the addition. The resulting reaction mixture was heated to 75° C. for 3 minutes. After this time, the reaction mixture was air cooled and diafiltered. The resulting retentate had a pH of 1.6 and a conductance 9900 umhos/cm. Diethylaminoethanol was added to alkalize the retentate to a pH of 10.5. This yielded a conductance of 2490 umhos/cm. The resulting alkalized solution was a clear tin/silica sol.

EXAMPLE 27

The tin/silica sol was prepared from anhydrous tin tetrachloride and NALCOAG 1034-A. The silicon dioxide to tin dioxide ratio was 4.76. A single dispersant was used in the preparation of the sol. The dispersant was Polymer 8 (see Table for chemical description). The tin oxide to dispersant ratio was 17.9.

NALCOAG 1034-A (500 gm) was diluted with 600 gm of water and treated with 4 gm of Polymer 8. To this mixture, anyydrous tin tetrachloride (62.6 gm, 0.24 moles) was added dropwise at a rate of approximately 20 grams/min. The resulting reaction was then heated to 80° C. for 50 minutes. At this point, the reaction mixture was air cooled and divided into two portions.

The first portion was diafiltered, yielding a retentate that had a pH of 1.8 and a conductance greater than 20,000 umhos/cm. Addition of diethylaminoethanol to alkalize the retentate to a pH of 9.5 yielded a conductance of 4900 umhos/cm and a stable sol. The second portion was treated with an additional 20 gm of Conoco AXC and diafiltered. The resulting retentate had a pH of 2.1 and a conductance of 9090 umhos/cm. At this point, addition of diethylaminoethanol to alkalize the retentate to 9.8 yielded a conductance 2870 umhos/cm.

The two portions were combined and concentrated to a final product. This final product had a total solids of 18.9% of which 2.5% was tin dioxide. The final pH was 9.6 and conductance was 3890 umhos/cm.

EXAMPLE 28

The tin/silica sol was prepared from stannic chloride pentahydrate and NALCOAG 1034-A. The silicon dioxide to tin dioxide ratio was 4.76. A single dispersant, Polymer 8 (see Table for chemical description), was used during the sol preparation. The tin oxide to dispersant ratio was 13.0.

The stannic chloride pentahydrate (82.8 gm. 0.23 moles) was dissolved in 300 gm of water. The NALCOAG 1034-A (500 gm) was diluted with 300 gm of water and treated with 5.5 gm of Polymer 8. The stannic chloride solution was then added to the dilute colloidal silica solution. After mixing, the mixture was heated to 60° C. Concentrated aqueous ammonium hydroxide (49 gm) was added (i.e., at a tin oxide to ammonium hydroxide ratio of 0.73) with the reaction mixture at 60° C. The reaction mixture was maintained at 60° C. for 10 minutes and then allowed to air cool. The resulting solution was then divided into two equal portions.

The first portion was diluted and diafiltered. The resulting retentate had a pH of 4.2 and a conductance of 79 umhos/cm. Diethylaminoethanol was used to alkalize the retentate to a pH of 10.5. The resulting conductance was 400 umhos/cm.

The second half of the reaction mixture was also diluted and diafiltered. The resulting retentate had a pH of 3.7 and a conductance of 238 unhos/cm. Here again, diethylaminoethanol was used to alkalize the retentate to a pH of 10.5.

The two alkalized retentates were combined and concentrated. The final product had a total solids of 17.5% of which 3.0% was stannic oxide. The product had a pH of 9.45 and conductance of 1910 umhos/cm.

I claim:

1. An aqueous alkaline hydrous metal oxide/silica sol having a pH of at least 8.5 which contains from 5–40% by weight $SiO_2$, from 1–10.5% by weight of hydrous metal oxide, and a water-soluble anionic stabilizing compound selected from the group consisting of water-soluble anionic surfactants having an HLB greater than 8 and water-soluble carboxylic acid polymers having a molecular weight in the range between about 1,000–1,000,000 with the ratio of hydrous metal oxide to water-soluble anionic stabilizing compound being within the range of 0.3:1 to 15:2, with the pH of said sol being produced by the presence of a water-soluble amine.

2. The alkaline hydrous metal oxide/silica sol of claim 1 where the water-soluble amine is diethylamino ethanol and the hydrous metal oxide is titania.

* * * * *